March 11, 1952 L. W. MARTIN 2,589,013
COMBINED BACK AND HEADREST
Filed Sept. 23, 1950 2 SHEETS—SHEET 1
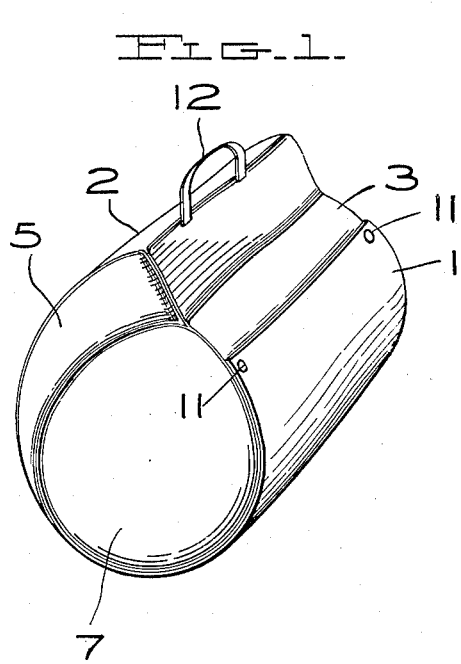
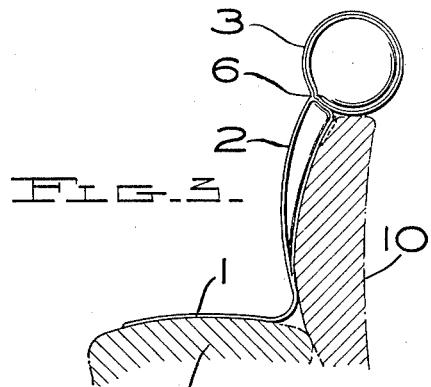
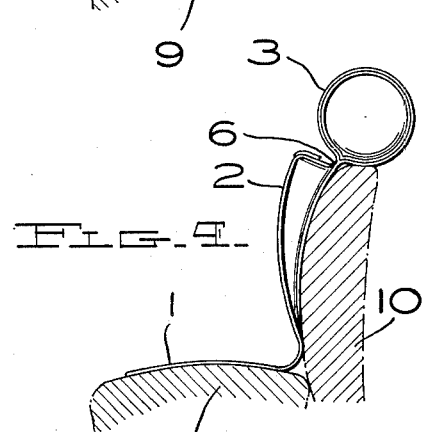
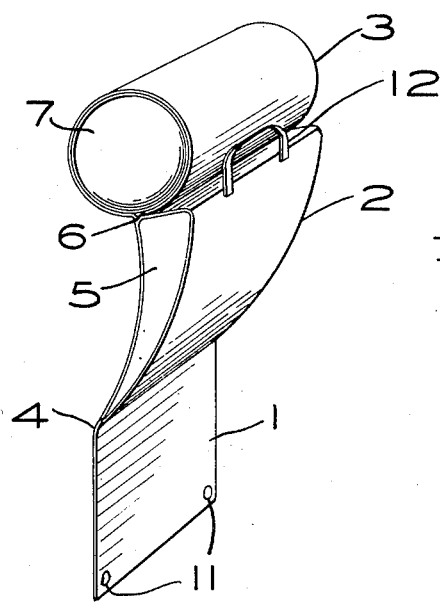
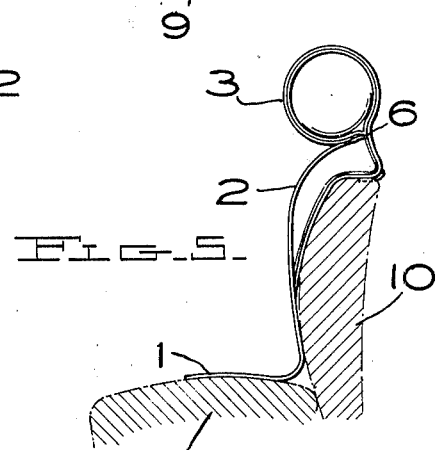
INVENTOR.
Lewis W. Martin
BY Alfred E. Ischinger
Attorney March 11, 1952 L. W. MARTIN 2,589,013
COMBINED BACK AND HEADREST
Filed Sept. 23, 1950 2 SHEETS—SHEET 2
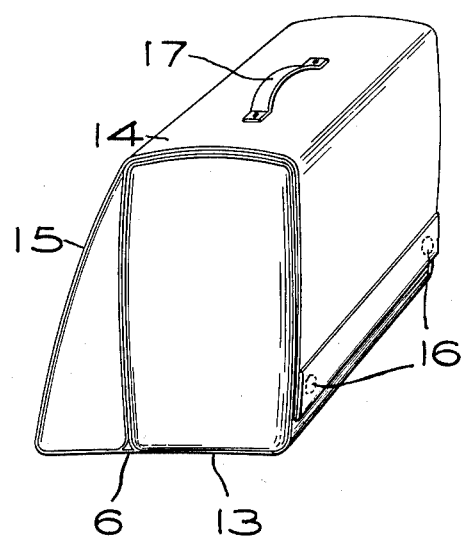
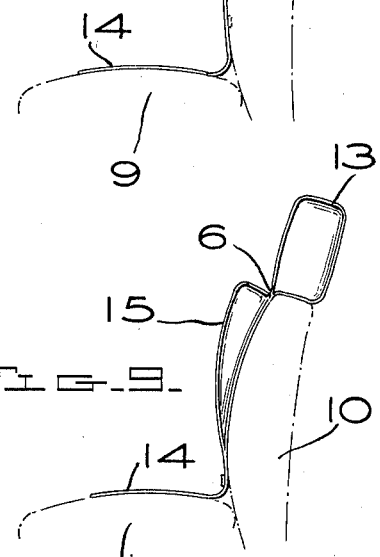
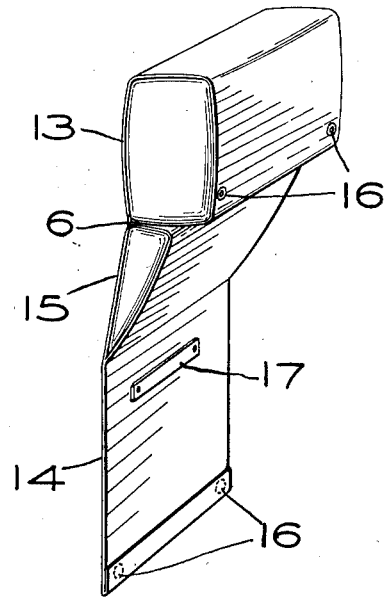
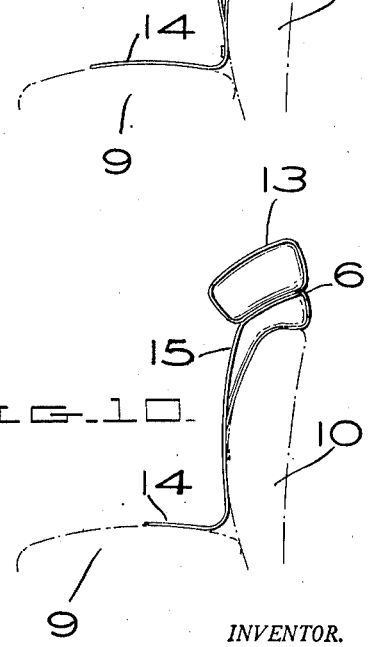
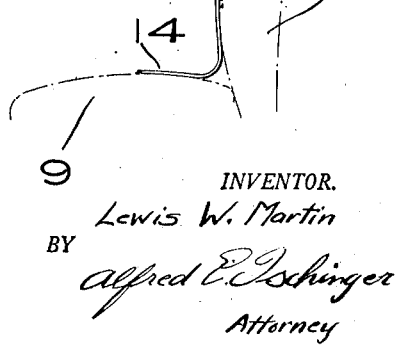
INVENTOR.
Lewis W. Martin
BY
Alfred E. Ischinger
Attorney

Patented Mar. 11, 1952

2,589,013

UNITED STATES PATENT OFFICE 2,589,013

COMBINED BACK AND HEADREST

Lewis W. Martin, Lancaster, Pa.

Application September 23, 1950, Serial No. 186,460

7 Claims. (Cl. 155—182)

This invention relates to cushions or head rests and more particularly to a foldable combined back and head rest which is adapted to supplement the seat of an automobile so as to provide a comfortable support for the body and head of a person seated in an automobile while viewing a motion picture in a "drive-in theater."

Automobile seats are designed to support the driver and passengers in their respective positions for safe driving and maximum enjoyment of the scenery. For this purpose the body has to be in an upright position with the head held erect for a clear view in all directions. This upright and erect position of the body and head, however, is not necessary, in fact becomes uncomfortable when viewing a motion picture from an automobile seat in a drive-in theater, and in order to place the body in a more comfortable position for this purpose it usually is necessary to either slump down in the seat or additionally support the head with a pillow which is loosely placed on top of the back of the seat. While this provides a makeshift support, it is not satisfactory and will not remain comfortable for any length of time.

One object of my invention is to provide a novel combined back and head rest which is adapted to supplement the back of an automobile seat and may be arranged and adjusted thereon to support the back and head of a person seated on the automobile seat in a position in which the motion picture on the screen of a drive-in theater can be viewed to the best advantage and in the most comfortable manner from any point or distance in front thereof.

Another object is to provide a combined back and head rest with certain structural and functional advantages not found in back or head rests of the prior art.

A further object is to combine the back and head rest in a single collapsible unit so as to make it foldable into a small package for convenient carrying and storage purposes.

It is also an object to so construct the combined back and head rest that it may be arranged in various ways for adjustment to the particular person using it.

It is a further object to hingedly connect the seat, back and head section of the combined back and head rest, so that each section thereof may be placed and adjusted relative to the other and temporarily held anchored to the seat of an automobile in order to support the head of the passenger in the most comfortable position above the back of the seat.

With these and other objects in view which will become more readily apparent from the following detailed description of practical and illustrative embodiments of my improvements shown in the accompanying drawings, my invention comprises the novel foldable combined back and head rest with its features of construction and arrangement of parts in cooperative relationship, as more particularly defined and indicated by the hereto appended claims.

In the accompanying drawings:

Figure 1 is a perspective view of the combined back and head rest as it appears when folded for carrying or storage purposes.

Fig. 2 is a perspective view of reduced size of the combined back and head rest as it appears unfolded, ready to be placed on an automobile seat.

Fig. 3 is an end elevational view of the combined back and head rest as it appears in one of its arrangements or positions on the seat of an automobile.

Fig. 4 is an end elevational view of the combined back and head rest as it appears in another of its arrangements or positions on the seat of an automobile.

Fig. 5 is a similar view of the combined back and head rest as it appears in still another arrangement or position on the seat of an automobile.

Fig. 6 is a perspective view of a modified form of the combined back and head rest.

Fig. 7 is a perspective view of reduced size of the modified form of the combined head and back rest as it appears unfolded, ready to be placed on an automobile seat.

Figs. 8, 9 and 10 are end elevational views of the modified combined back and head rest in various arrangements or positions on the seat of an automobile.

It will be helpful to an understanding of my invention to first briefly consider some of the more important aspects and features thereof, so that these may be kept in mind during the subsequent reading of the detailed description of the practical and illustrative embodiments shown in the accompanying drawings. Accordingly, it is pointed out that my invention is adapted to fill a need which has been brought about by the outdoor motion picture theaters, better known as "drive-in theaters," in which the motion picture is viewed by the occupants of automobiles parked in front of the motion picture screen. In these drive-in theaters the parking space from which the picture can be viewed is arranged directly in front and to either side of the screen, and each automobile as it enters the parking area is assigned a parking space, just as a vacant seat is assigned to a patron of the ordinary motion picture theater. This parking space may be directly in front or to one side or the other of the center of the screen and, of course, varies in its distance from it. It is therefore necessary for the occupants of the car to so position themselves in the automobile that the picture on the screen can be viewed from their seat in the most comfortable manner. What is needed most in this case is a head support which in combination with a back support may be so arranged on the seat and against the back thereof that the entire body and head is held or supported on a cushioned surface so that the picture on the screen is in an unobstructed line of vision, and remain without effort in this position. For this purpose the combination back and head rest forming the subject matter of my invention is made up of a seat, a back, and a head section, which are consecutively arranged and hingedly connected with each other so that they may be placed on the seat of an automobile to provide any desired support which is found necessary for the back and head to be comfortable in order to conveniently watch and enjoy the motion picture on the screen.

The seat section of the combination back and head rest is thin and when placed on the seat of the automobile, will not appreciably increase its height, and with a person sitting on it will act as an anchor to keep the back and head rest sections in their adjusted position on the seat. The back rest section is wedge shaped and increases in thickness toward the head rest so as to have its supporting surface in one of its uses merge into the supporting surface of the head rest in such a manner that a portion of the head rest is partially located above the back rest and partially overhangs it in order to properly locate and firmly hold the head rest on top of the back of the automobile seat.

In another position or arrangement the head rest is entirely supported on the top of the back of the automobile seat with the back rest against the back of the seat in front of the head rest.

In another position the upper portion of the back rest is folded over the top of the back of the automobile seat so that the head rest can be placed on top of the folded back section to thus provide an elevated head support above the back of the automobile seat.

Referring now more particularly to the figures of the drawings, reference numeral 1 indicates the seat section, 2 indicates the back rest section and 3 indicates the head rest section. A flexible connection 4 is provided between the seat and back rest section in such a manner that their front and back merge and form continuations of each other. The seat section 1 is made up to have but very little thickness and in the form shown comprises two layers of material which are suitably folded and bound together along the free edges thereof. Continuations of the two layers of material provide the front, back and top of the back rest 2 and with triangularly shaped ends 5 of the same or similar material and suitable upholstery material between them form the pillow which provides the wedge shaped back rest 2. From one edge of the thick end of the back rest 2 the cover material continues to form the outside or cover for a substantially cylindrical pillow and at the same time provide a flexible connecting hinge 6 between this pillow and the back rest 2. The pillow is filled between its circular ends 7 with suitable upholstery material to complete the head rest 3. The back rest 2 and the head rest 3 are thus connected in a manner so that various arrangements and adjustments of the head rest on top of the back of the seat of an automobile are made possible.

All automobile seats have a seat 9 and a back 10, and both of these are arranged substantially as illustrated in Figs. 3, 4 and 5. When it is desired to use the combined back and head rest, above described, on the automobile seat, it is arranged with the seat or anchor section 1 thereof placed on the seat 9 and the back rest 2 placed against the back 10 with the head rest 3 overhanging the top of the seat. In this arrangement, which is shown in Fig. 3, the hinged connection 6 is in front of the back rest 2, so that the head rest 3 is held on top of the back rest 2 and extends rearwardly over the back 10 of the seat.

In the arrangement illustrated in Fig. 4 the back rest 2 is reversed and is placed against the back 10 so that its hinged connection 6 is along the rear of the back rest 2 adjacent to the top of the back 10 of the automobile seat. In this position the back rest 2 projects forwardly of the back 10 of the seat while the head rest 3 extends over the top of the back of the seat.

In the arrangement illustrated in Fig. 5 part of the back rest 2 is located in front of the back 10 and part is folded over the top thereof with the hinged connection 6 in a position in which the head rest 3 will swing forward and fold over the back rest so as to raise the head support provided by the head rest 3. In this way the combined back and head rest is adapted to provide a variably angular and vertical support for the back and head of a person seated on an automobile seat.

When the combined back and head rest is not in use it is folded into the small compact bundle illustrated in Figure 1. This is done by wrapping the seat 1 and back rest 2 around the head rest 3 and fastening the end of the seat to the head rest by means of suitable snap fasteners 11—11.

A handle 12 provided on the edge of the back rest 2, opposite to its hinged connection with the head rest, permits a ready handling of the back and head rest when not in use.

Figures 6 to 10 inclusive illustrate a modification of the combined back and head rest in which the head rest 13 is substantially rectangular in cross section. In this form of my invention the combined back and head rest folds into a package having an outline as illustrated in Fig. 6. The seat section 14 and back rest 15 are hingedly connected with each other and the head rest 13 in substantially the same manner as illustrated in connection with the combined back and head rest illustrated in Figures 1 to 5 inclusive, and suitable fasteners 16—16 are provided on the seat section and the head rest to hold the folded seat section, back rest and head rest together and permit the package to be carried by means of the handle 17.

While I have illustrated and described two practical and illustrative embodiments of my novel combined back and head rest, it is to be understood that other changes and modifications thereof are possible without departing from the scope of my invention which is more particularly indicated by the hereto appended claims. It is also understood that while the combined back and head rest has been specifically described for use on automobile seats, the combined back and head rest may be used in any way in which it is found to be practical and useful.

I claim:

1. A foldable combined back and head rest for automobile seats comprising a flexible, uniformly thin seat section, a flexible back rest section of gradually increasing thickness flexibly hinged to said seat section with the thin end thereof, and a head rest section flexibly hinged to the thick end of said back rest section offset from the center between the front and back thereof.

2. A foldable combined back and head rest for automobile seats comprising a flexible, uniformly thin seat section, a substantially wedge shaped back rest section flexibly connected to said seat section with the thin end thereof, and a head rest section flexibly connected to one edge of the thick end of said wedge shaped back rest.

3. A foldable combined back and head rest for automobile seats comprising a flexible, uniformly thin seat section, a substantially wedge shaped back rest flexibly connected to said seat section with its thin end thereof, a substantially cylindrical head rest flexibly hinged to said wedge shaped back rest for movement over or away from the thick end of said wedge shaped back rest.

4. A foldable combined back and head rest for automobile seats comprising a flexible seat section of uniform cross section, a substantially wedge shaped back rest flexibly connected to said seat section with its thin end thereof, a head rest having a thickness greater than the thickness of the thick end of said back rest and flexibly connected thereto so as to be foldable over the thick end of said back rest in one position and over the side adjacent the thick end of said back rest in another position.

5. A foldable combined back and head rest comprising a flexible seat section, a flexible substantially wedge shaped back rest and a substantially rectangularly shaped head rest consecutively and flexibly connected with one another to permit the back rest to be folded against one side of said head rest and said seat section folded against another side of said head rest, and means for locking said seat section against said head rest.

6. A foldable combined back and head rest comprising a flexible seat section, a flexible back rest and a head rest consecutively and flexibly connected with one another to permit the seat section and back rest to be wrapped against said head rest, handle means on said back rest spacedly arranged from the connection between said back rest and said head rest, and cooperative fastening means on said head rest and said seat section for locking engagement with each other to hold said seat section and said back rest against said head rest with said handle means projecting from said back rest.

7. A foldable combined back and head rest comprising a flexible seat section, a flexible substantially wedge shaped back rest and a substantially rectangularly shaped head rest consecutively and flexibly connected with one another to permit the back rest to be folded against one side of said head rest and said seat section folded against another side of said head rest, handle means on said seat section, and means for locking said seat section against said head rest with said handle means in overlying position on said head rest.

LEWIS W. MARTIN.

REFERENCES CITED

The following references are of record in the file of this patent:

UNITED STATES PATENTS

| Number | Name | Date |
|---|---|---|
| 33,385 | Frodsham et al. | Oct. 1, 1861 |
| 324,839 | Hazen | Aug. 25, 1885 |
| 633,012 | Kidd et al. | Sept. 12, 1899 |
| 1,673,433 | Wheeler et al. | June 12, 1928 |

FOREIGN PATENTS

| Number | Country | Date |
|---|---|---|
| 367,953 | Italy | Feb. 7, 1939 |